United States Patent [19]

Druskin et al.

[11] 4,214,538
[45] Jul. 29, 1980

[54] THREE WAY GARDEN TOOL

[76] Inventors: Barry S. Druskin, 397 Wildrose Ave., Bergenfield, N.J. 07621; Robert A. Stumpp, 59 Old Chimney Rd., Upper Saddle River, N.J. 07458; Nora M. Muccio, 130 Grand Ave., Palisades Park, N.J. 07650

[21] Appl. No.: 917,558

[22] Filed: Jun. 21, 1978

[51] Int. Cl.$^2$ .............................................. A01C 5/02
[52] U.S. Cl. ......................................... 111/95; 7/114; 172/375; 222/191; 222/520
[58] Field of Search ...................... 111/95, 96, 97, 98, 111/99; 172/375; 222/191, 502, 503, 520, 521, 470, 549; 7/114, 115, 116

[56] References Cited

U.S. PATENT DOCUMENTS

| | | | |
|---|---|---|---|
| 1,179,726 | 4/1916 | James | 111/95 |
| 1,900,827 | 3/1933 | Love | 111/99 |
| 2,076,120 | 4/1937 | Cyganick | 172/375 |
| 2,737,318 | 3/1956 | Molinare | 222/191 |
| 2,857,864 | 10/1958 | Cromer | 111/95 |

Primary Examiner—Edgar S. Burr
Assistant Examiner—James R. Feyrer
Attorney, Agent, or Firm—Constantine A. Michalos; Peter C. Michalos

[57] ABSTRACT

A three way garden tool comprising a hollow handle having an opening, a trowel and tamping member connected to one end of the hollow handle with the hollow handle being closed at its other end. A sleeve is slid over the hollow handle adjacent to the opening in the hollow handle to selectively cover the opening, expose a portion of the opening or expose the entire opening. The trowel and tamping member is flat and includes a plurality of digging teeth on at least one edge thereof to be used for digging up for example a bare spot in a grass lawn. Seed, for example grass seed, can be loaded through the aperture and into the hollow handle and retained therein by sliding the sleeve over the aperture. When a bare spot in a lawn is to be treated, the trowel and tamping tool is used to score and dig up the bare spot, the sleeve is moved over the hollow handle exposing a slot shaped portion of the opening and seed can be dropped from the opening and distributed over the bare spot. The sleeve is then positioned to again cover the opening and the flat trowel and tamping member can be used to tamp and compress the dug and scored earth of the bare spot to properly set the seed therein.

5 Claims, 7 Drawing Figures

U.S. Patent  Jul. 29, 1980  4,214,538
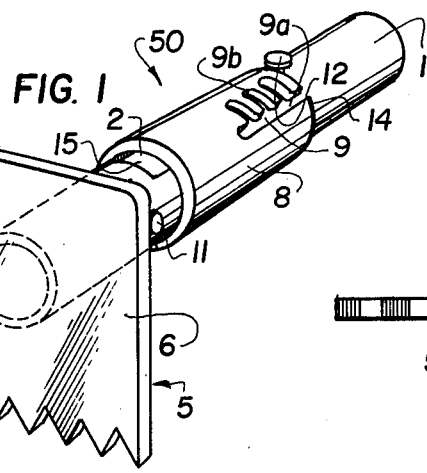
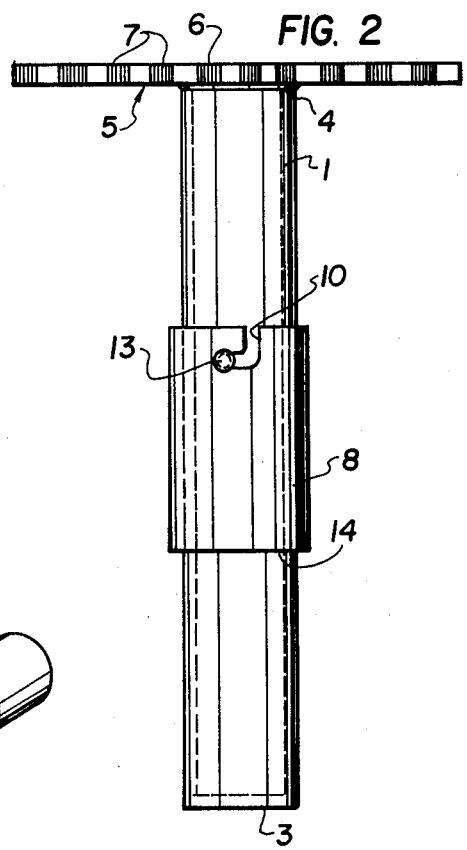
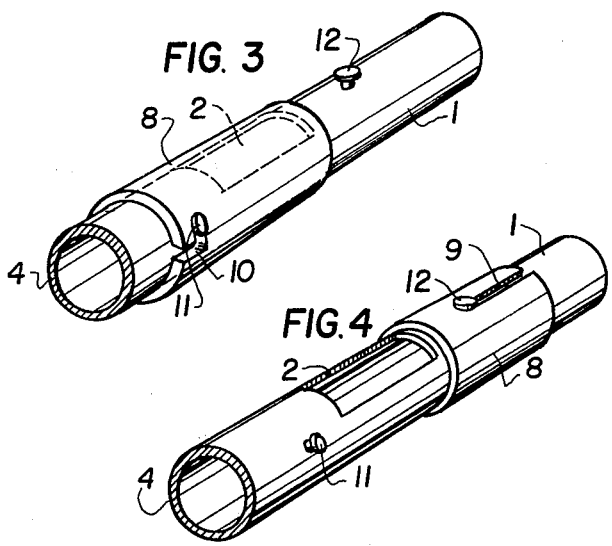
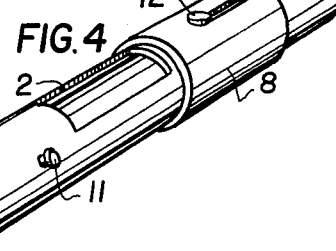
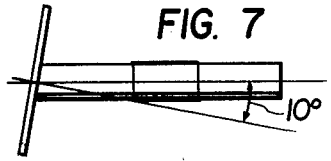
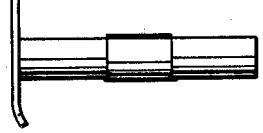
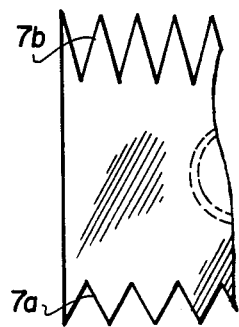

THREE WAY GARDEN TOOL

BACKGROUND OF THE INVENTION

1. Field of the Invention

The present invention relates in general to garden tools and, in particular, to a new and useful three way garden tool which can be used for digging up a bare spot on, for example a lawn, seeding the bare spot with, for example grass seed and tamping and setting the distributed seed into the bare spot.

2. Description of the Prior Art

A wide variety of garden tools are known for digging up and excavating areas in preparation for seeding, fertilizing and the like. Various devices are also known for distributing seed or fertilizer in even patterns over an excavated area to be treated. Further devices are known for tamping down the seeded or fertilized area to properly set these seeds or fertilizer into excavated earth.

Garden tools are also known which provide a multitude of functions within a single unit. Examples of multiple use garden tools include U.S. Pat. No. 133,709 to Jones issued 1872, U.S. Pat. No. 419,928 to Clayiborne issued 1880, U.S. Pat. No. 488,596 to Ayers issued 1892, U.S. Pat. No. 1,179,726 to James issued 1916, U.S. Pat. No. 2,611,514 to Peyton issued 1947, U.S. Pat. No. 3,147,718 to Steinberg issued 1961 and U.S. Pat. No. 4,011,612 to Atkinson issued 1977. Several of these patents include hollow handles for retaining or channeling seeds or fertilizers into selected areas on the ground, and ground engaging tool ends for excavating, digging, scoring or otherwise treating ground to be planted or fertilized.

A problem which often arises in the maintenance of a grass lawn is the treatment of small bare spots in the lawn which are caused by, for example mechanical injury, a lack of nutrition or other deficiency in the lawn in the area of these bare spots or the removal of weeds or other undesired plants from the lawn. In the maintenance of golf courses especially bare spots are often prevalent due to the striking of the lawn with golf clubs and the constant wear and tear which is caused the unavoidable traffic on golf courses. Bare spots are also a common problem faced by home owners in the maintenance of their lawns which, due to the nuisance of assembling seed, tools, fertilizer and the like often go untreated.

The treatment of such bare spots is usually accomplished by first excavating, digging or scoring the bare spot with for example a trowel or rake device then seeding the area and/or applying fertilizer thereto. The area must then be tamped or compressed to properly set the seed and/or fertilizer into the bare spot so that the seed may be properly anchored in the earth so that it may grow in a normal fashion.

To properly accomplish this task, a rake or trowel must first be used to excavate the area, seed and/or fertilizer must be applied to the area from such form of distribution tool or by hand and finally a tamping tool such as a flat plate with a weighted stem must be used to tamp down the earth in the seeded area to properly set the seed. The prior art as exemplified in the aforementioned patents does not provide a single satisfactory tool which can be utilized to properly seed a bare spot in a convenient and efficient manner.

SUMMARY OF THE INVENTION

The present invention is drawn to a single garden tool which can be utilized in scoring or excavating a bare spot on for example a lawn, supplying seed or fertilizer to the excavated area and to finally tamp the excavated area to set the seed or fertilizer. The invention is also drawn to a method for accomplishing the aforementioned process utilizing an inventive tool structure.

Accordingly, a three way garden tool is disclosed which comprises a hollow handle having an aperture therein, a flat trowel and tamping member connected to one end of the hollow handle, the other end of the hollow handle being closed to define a seed containing space therein, a slidable sleeve disposed over the hollow handle adjacent the aperture for retaining and dispensing seed into and from the hollow handle and seeding adjustment means connected between the sleeve and the hollow handle for selectively positioning the hollow handle to firstly entirely uncover the aperture so that the hollow handle can be loaded with seed, secondly entirely cover the aperture to retain the seed within the hollow handle and thirdly uncover a portion of the aperture to dispense seed according to its size onto an area of ground.

The adjustment means may comprise first and second raised rivets or posts disposed adjacent opposite ends of the opening and first and second slots at respective ends of the sleeve which are selectively engageable into the first and second raised rivets or posts to selectively position the sleeve in its closed, open and partially opened positions.

Accordingly an object of the present invention is to provide a garden tool comprising a hollow handle having an opening, a trowel and tamping member connected to one end of the hollow handle, a sleeve slideable over the hollow handle adjacent the aperture or opening in the hollow handle and positionable in a first position to cover the aperture, a second position to open the aperture and at least one third position to expose a portion of the aperture whereby feed can be loaded into the aperture when the sleeve uncovers the aperture, and be retained within the hollow handle when the sleeve covers the aperture and can be dispensed out of the hollow handle through a portion of the aperture when the sleeve uncovers the portion.

A further object of the present invention is to provide a three way garden tool which is simple in design, rugged in construction and economical to manufacture.

The various features of novelty which characterize the invention are pointed out with particularity in the claims annexed to and forming a part of this disclosure. For a better understanding of the invention, its operating advantages and specifics objects attained by its uses, reference should be had to the accompanying drawings and descriptive matter in which there is illustrated a preferred embodiment of the invention.

BRIEF DESCRIPTION OF THE DRAWING

In the drawings:

FIG. 1: Is a front perspective view of a three way garden tool made in accordance with the invention;

FIG. 2: Is a bottom plan view of the embodiment of FIG. 1;

FIG. 3: Is a front perspective view of the hollow handle portion of the embodiment of FIG. 1 showing the sleeve covering the aperture in the handle;

FIG. 4: Is a view similar to FIG. 1 with the sleeve in a position uncovering the aperture;

FIG. 5: Is a fragmentary detail of another embodiment for the tamping head in accordance with the invention;

FIG. 6: Is a fragmentary plan view of another embodiment of the invention;

FIG. 7: Is a view similar to FIG. 6 of a still further embodiment of the invention.

DESCRIPTION OF THE PREFERRED EMBODIMENT

Referring now to the drawings in particular the invention embodied therein comprises, in FIG. 1, a three way garden tool generally designated 50 comprising a hollow handle 1 having an opening or aperture 2 which is preferably of slot or rectangular shape. Hollow handle 1 is closed at its one end and at its opposite end having a claw or trowel and tamping member 5. Claw or trowel tamping member 5 includes a plurality of digging teeth 7 which can be utilized in excavating for example a bare spot on the lawn to be seeded. In addition it has a flat tamping surface 6 which can be utilized for tamping the excavated seeded area.

The member 5 further includes a sleeve 8 which is positioned over opening 2 and has an elongated slot 9 which extends substantially along the major axis of the sleeve 8. Sleeve 8 further includes an L shaped slot 10. Raised rivets or posts 11 and 12 are positioned on the hollow handle 1 adjacent to respective opposite ends of the aperture or opening 2.

Slots 10 and 9 with posts 11 and 12 form seeding slot adjustment means for varying the size of the seeding slot or opening 15 which is exposed with moving of sleeve 8. In operation sleeve 8 may be slid toward the claw 5 and rotated on the hollow handle 1 so that raised rivet 11 can be engaged into the L shaped slot 10. Sleeve 8 may then further be rotated so that rivet 11 is seated into L shaped slot portion 13 to firmly secure sleeve 8 over aperture 2 to cover the aperture. This first position of sleeve 8 contains seeds or fertilizers which are retained within the hollow handle 1 so that handle 1 may be grasped and used to excavate or score the ground to be seeded or fertilized with the teeth 7 of claw or trowel tamping member 5. To load hollow handle 1 with seed or fertilizer, sleeve 8 may then be rotated to disengage slot 10 from rivet 11 and sleeve 8 may further be slid backwardly away from claw 5 so that the rear edge or end 14 of sleeve 8 is abutted against raised rivet or post 12. The abutment of end 14 against rivet 12 exposes a seeding slot 15 of the aperture 2 which permits a flow or distribution of seed from the hollow handle out onto ground which has been suitably treated by claw 5.

Referring now to FIG. 4, a second open position of sleeve 8 is shown whereby aperture or opening 2 is completely exposed so that seed or fertilizer can be loaded into hollow handle 1. For this purpose elongated slot 9 is provided at the rear end of sleeve 8 and sleeve 8 may be rotated until slot 9 aligns with rivet 12 and then sleeve 8 may further be slid backwardly away from claw 5 to seat the rivet 12 into the slot 9. This action fully exposes opening 2 which can then be loaded with the desired material.

FIG. 3 shows a variation for the construction of slot 9 in FIG. 4, which includes an elongated slot portion 9A extending substantially along the major axis of sleeve 8 and a plurality of finger shaped slot portions extending circumferentially of the sleeve 8 and disposed along the major axis of sleeve 8. As shown in dot dash line, sleeve 8 can be set in a variety of three positions for varying the seeding slot opening 15 so that seed or fertilizer of different sizes may be dispensed from the hollow handle 1. Raised rivet 12 is selectively positioned into one of the plurality of finger shaped slot portions 9B the setting the size of seeding slot 15.

Referring now to FIG. 5 another embodiment for the construction of the trowel and tamping member 5 is shown which includes a first row of large teeth 7A on one side of the member 5 and a second row of smaller teeth 7B on the side opposite from the teeth 7A. These teeth may selectively be used for example to roughly excavate then finally rake ground in a bare area to be seeded. This construction can also be used for providing the proper tool in various gardening operations. FIG. 6 shows an embodiment for the claw 5 wherein one end of the claw 5 is curved to alter the functioning of the claw for selective other gardening functions.

FIG. 7 shows an embodiment of the invention wherein the substantially flat claw 5 is disposed at an angle to the major axis of the handle 1 which angle has been found to be within the preferrable range of from about 70 to about 90 degrees. The angle must be retained narrowly so that the tamping surface 6 may be effectively used by grasping the handle 1 to tamp an excavated seeded area.

The plurality of finger shaped slot portions 9B are positioned and selected so that slot sizes 15 may be chosen to be compatible with the seed used. For example, a very small slot 15 will be selected for use in distributing grass seed which is of a small elongated shape that flows easily. Slot 15 may accordingly be selected of a larger size to plant for example flower seed which may be of a size larger than grass seed. Slot 15 may further be opened to an even wider extent to distribute finely granulated fertilizer generously in a bare area or to distribute exceptionally large seed.

While a specific embodiment of the invention has been shown and described in detail to illustrate the application of the principles of the invention, it will be understood that the invention may be embodied otherwise without departing from such principles.

What is claimed is:

1. A hand held garden tool for excavating, seeding and tamping an area comprising, a hollow handle having an aperture therein, a substantially flat trowel and tamping member having a plurality of digging teeth connected to and closing one end of said hollow handle, said hollow handle being closed at its end opposite from said trowel and tamping member and defining a seeding space, a sleeve slidable over said hollow handle adjacent said aperture positionable in a first position for closing said aperture and said seed space, a second position spaced from said aperature for opening said aperture and at least one third position intermediate said first and second positions and partially covering said aperture for defining a seeding slot, and seeding slot adjustment means connected between said sleeve and said hollow handle for placing said sleeve in said first, second and third positions whereby seeds and the like can be loaded into said hollow handle through said aperture when said sleeve is in said second position, the seed and the like can be retained within said hollow handle when said sleeve is in said first position and the seed and the like can be dispensed when said sleeve is in said at least one third position, and whereby said trowel and tampering member can be used to excavate an area, the seed and the like can be dispensed onto said area, and said trowel and tamping member can be used to flatten and tamp the area after seeding, said seeding slot adjustment means comprising a first raised rivet spaced from one end of said aperture on said hollow handle, a second raised rivet spaced from an end of said aperture opposite said first raised rivet, said sleeve including an L shaped slot at its one end adjacent said first raised rivet engageable with said first raised rivet for placing said sleeve into said first position, said sleeve further including an elongated slot on its side opposite from said L shaped slot engageable with said second raised rivet for placing said sleeve into its second position, said sleeve being positionable into said at least one third position by abutting the end of said sleeve adjacent said elongated slot against said second raised rivet, said elongated slot extending substantially parallel to the major axis of said sleeve and includes a plurality of finger shaped slot portions disposed along the major axis of said sleeve and extending circumferentially thereof, said second raised rivet being selectively engageable into one of said finger shaped slot portions for determining the size of said seeding slot and positioning said sleeve into additional third positions.

2. A garden tool according to claim 1 wherein said digging teeth comprise a first row of large digging teeth on one side of said trowel and tamping member and a second row of smaller teeth disposed on a side of said trowel and tamping member opposite from said first row.

3. A garden tool according to claim 1 wherein said trowel and tamping member is disposed at 90 degrees to a major axis of said hollow handle.

4. A garden tool according to claim 1 wherein said trowel and tamping member is disposed at an angle of between about 70 to 90 degrees to a major axis of said hollow handle.

5. A garden tool according to claim 1 made entirely of metal of sufficient weight to enhance the tamping action of said trowel and tamping member.

* * * * *